March 29, 1960     A. G. KALSTEIN ET AL     2,930,954
ELECTRIC CAPACITOR
Filed Nov. 29, 1955
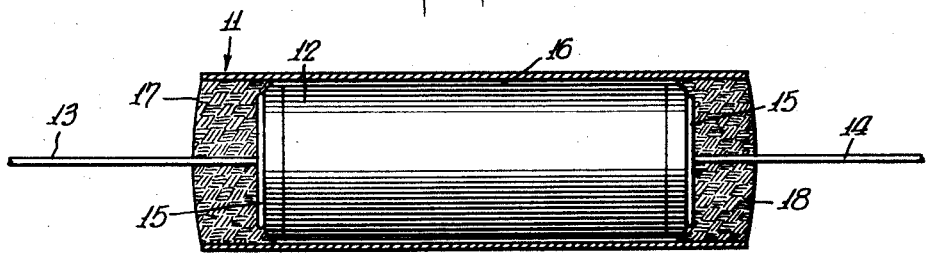
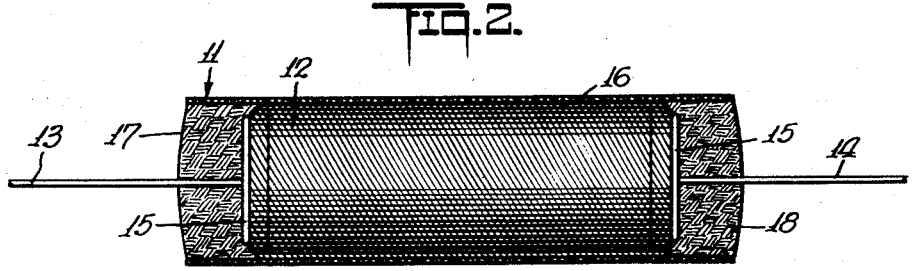
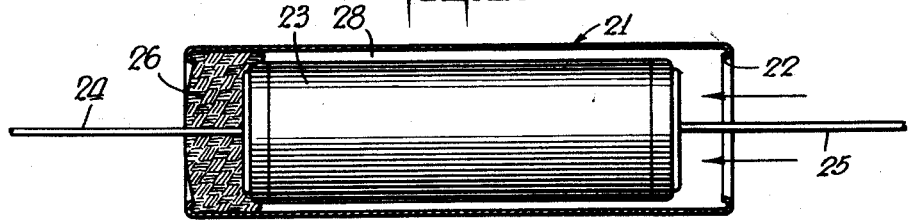
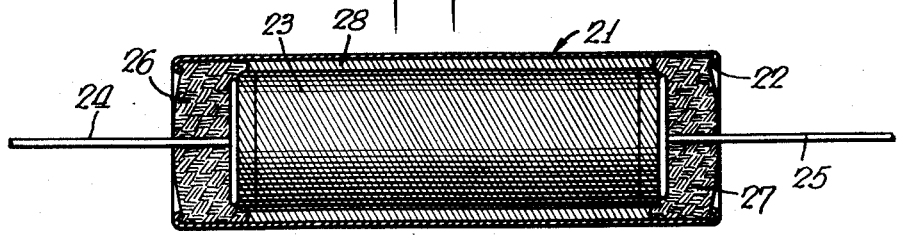
INVENTOR
Abraham G. Kalstein
William Kameron
BY
Dean Fairbank & Hirsch
ATTORNEYS

2,930,954
ELECTRIC CAPACITOR

Abraham G. Kalstein and William Kameron, New Bedford, Mass., assignors to Aerovox Corporation, a corporation of Massachusetts Application November 29, 1955, Serial No. 549,605

2 Claims. (Cl. 317—258)

Our present invention is primarily concerned with electrostatic capacitors, more particularly of the rolled or tubular type having an outer casing. This application is a continuation-in-part of our co-pending application, Serial Number 152,286, filed March 28, 1950, and now abandoned.

It is among the objects of the invention to provide a capacitor unit which may include a conventional capacitor section of metal foil and dielectric such as paper, which unit is relatively inexpensive in cost and simple to manufacture, yet which has excellent voltage, power factor, temperature and dielectric constant characteristics.

Another object is to provide a capacitor unit of the above type in which the casing is securely bonded to the capacitor section to form an integral part of the unit and which casing is impervious not only to water, but also to oil, gas and to vapor and resistant to acid and alkali, and which has high insulation resistance and negligible water absorption and vapor transmission rate without the inclusion of metal foil vapor barriers.

Another object is to provide a capacitor unit of the type having end seals providing a secure water, oil and gas tight closure, and at which the terminals of the capacitor are exposed and from which they may protrude without interference with the efficacy of such seal.

Another object is to provide a method for forming a capacitor unit of the above type with a casing therearound without the need for elaborate molding equipment.

According to one aspect of the invention, the capacitor section introduced into a casing is impregnated with a polymerizable resinous product of the requisite dielectric properties completely to fill all voids in and about the section and in the casing and between the section and the casing, which resinous product, upon polymerization, becomes a hard, tough, water, acid and alkali resistant product that bonds all of the structural elements of the unit together.

According to another aspect of the invention, the unimpregnated capacitor section is first introduced into a tubular casing which protrudes beyond the ends of the section and plastic material is poured into one and preferably both ends of the tubular casing about the exposed terminals of the capacitor section to confine the section therebetween. If the casing is of porous material, the end seals or plugs are preferably impervious and if of impervious material, one or more passageways are afforded at one or both of the ends, so that in the subsequent impregnation cycle, dielectric impregnant in suitable liquid form will, under applied vacuum, enter through the porous casing or through one or both of the ends of the casing as the case may be.

Preferably the impregnating material is a resinous product having the desired dielectric properties and which may be of polyunsaturated alkyd resin copolymerized with styrene monomer, which under moderate heating, becomes so fluid as readily to impregnate the casing, when this is of porous material and readily to enter the interstices or voids of the capacitor section and the spaces between the capacitor section and the tubular casing and the passageways, if any, in the ends. The impregnant upon subsequent curing will become a solid, essentially insoluble and infusible mass which will bond the various elements of the capacitor section into a firm and permanent unitary structure with the tubular casing itself serving as a mold so that a casing of such solidified impregnant will completely encompass and fill the capacitor section, bonding thereto and to the end seals or plugs of the tubular casing, thereby forming an integral unit.

Although any suitable plastic material having a high melting point could be used for the end seals, they preferably are made of resin similar to and compatible with the impregnant, modified however, to adapt it for quick setting by the omission of any inhibitor therefrom and incorporated with a suitable inert filler to avoid cracking or crazing thereof on rapid hardening.

The formulation of the resin used according to the present invention and the mode of preparation and treatment thereof will now be set forth in greater detail:

The unsaturated alkyd resins which are used in accordance with our invention, may be formed by reacting a mixture of polyhydric alcohols and polybasic acids, at least one alcohol or acid of which is unsaturated.

It is of course manifest that when saturated polyhydric alcohols are used in making the unsaturated alkyds, the polybasic acid or mixture of acids used in the reaction to form the alkyd would include an unsaturated acid or mixture of acids which are capable of forming an unsaturated alkyd resin with the polyhydric alcohol. Likewise, when saturated polybasic acids are used in making the unsaturated alkyds, the polyhydric alcohol or mixture or alcohols used in the reaction to form the alkyd would include an unsaturated alcohol or mixture of alcohols which are capable of forming an unsaturated alkyd with polybasic acid.

The saturated polyhydric alcohols which may be used with unsaturated polybasic acid in forming the unsaturated alkyds described above are preferably the lower glycols containing from two to four carbon atoms between a pair of alcoholic hydroxy groups, such as ethylene glycol, 1,2-propylene glycol, isobutylene glycol, trimethylene glycol, 1,4-butylene glycol, phthalyl alcohol, and the like. Other saturated polyhydric alcohols which may be used are glycerol, alphamethylglycerol, pinacole, sorbitol, mannitol, erythritol, pentaerythritol, diethylene glycol, pentamethylene glycol, triethylene glycol, tetramethylene glycol, hexamethylene glycol, and the like.

Unsaturated polyhydric alcohols which may be used with saturated polybasic acids to produce the unsaturated alkyd resins are unsaturated glycols such as vinyl glycol

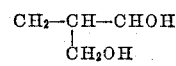

or the compound:

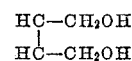

The preferred unsaturated acids which may be used with saturated polyhydric alcohol in making the alkyds are the alpha, beta, unsaturated polycarboxylic acids or anhydrides thereof such as maleic, fumaric, itaconic, citraconic, acetylene dicarboxylic, glutaconic, methylene malonic, mesaconic acids or mixtures thereof. Other polycarboxylic unsaturated acids may be used as may also mixtures of unsaturated polycarboxylic acids and saturated polycarboxylic acids such as phthalic acid or phthalic anhydride, succinic, adipic, azalic, sebacic, malonic and the like.

The characteristics of these unsaturated alkyds may be modified by including as a reactant, a monohydric alcohol such as allyl, methanallyl, crotyl, beta ethallyl, proparglyl, tiglyl, citronnelyl, oleyl, and the like unsaturated monohydric alcohols, or by including in the reaction mixture a saturated monohydric alcohol, such as methyl, ethyl, propyl, butyl, etc. The characteristics of these unsaturated alkyds may also be modified by including in the reaction mixture monocarboxylic acids such as acetic acid, propionic acid, acrylic acid, methacrylic acid, alpha-chloroacylic acid, butyric acid, oleic acid, linoleic acid, linolenic acid, benzoic acid and the like.

The outstanding advantages of these unsaturated alkyds for the dielectric purposes of the present invention are obtained when the reaction is carried out until the acid number thereof is below about 20. The lower the acid number the better the power factor of the capacitor and the longer its useful life. An acid number of about 5 is deemed best for practical purposes, since the cost of bringing the acid number even lower is frequently not justified by any further improvement in the characteristics of the capacitor.

In general, the use of unsaturated alkyds having an acid number as low as above indicated is not, in the absence of other processing thereof, practicable for impregnation, because such alkyds ordinarily are of very high viscosity and are not very amenable to being handled without copolymerizable monomers such as styrene and the like.

Superior chemical and physical properties, as well as better compatibility with copolymerizable monomers, such as styrene, can be obtained if the adkyds above described are alcoholized. Some of the alcohol used in such alcoholysis treatment may be introduced into the alkyd, the amount so introduced depending largely upon the duration of the alcoholysis treatment. It is preferred that the amount of alcohol so introduced into the alkyd should not exceed 0.75 mol, and preferably should be no more than 0.5 mol and no less than 0.02 mol of alcohol per mol of acid or mixture of acids used in making the alkyd. The alcohol which may be used in the alcoholysis may be alkyl alcohol, methallyl alcohol, methyl alcohol, ethyl alcohol, propyl alcohol, butyl alcohol, and the like, and even polyhydric alcohols, for example, glycerol may be used for such alcoholysis.

For making the preferred unsaturated alkyds for use as a dielectric in accordance with the present invention, and unreacted alcohol present in the alkyd following the alcoholysis step is removed as by a topping procedure. Thereupon, the alcoholized alkyd is preferably acidulated to esterify and neutralize the free hydroxyl radicals. Any suitable acid may be used to effect this acidulation, but it is preferred to use an organic acid which is free from alcoholic hydroxy groups. Any suitable monocarboxylic acid or anhydride will serve, such as acetic acid, propionic acid, acrylic acid, methacrylic acid, oleic acid, cinnamic acid, benzoic acid, chloroacetic acid and the like.

The exact nature of the reaction involved in this alcoholysis step has not been determined due to the complexity of the molecules that are involved, but it is believed that the alcohol breaks the molecular chains of unsaturated alkyds to shorter molecular linkages, thereby effecting the reduction in viscosity referred to above.

Conventional procedures may be employed in preparing the unsaturated alkyds described above. In the case of the preferred unsaturated alkyd, it is preferred that the alcoholysis be carried out under reflux, under such conditions that no substantial portion of the reactants or reaction products are removed from the system during the reaction.

The various reactions herein described may be conducted in an inert atmosphere by bubbling carbon dioxide through the reaction mixture. Polymerization inhibitors such as tertiary butyl catechol, hydroquinone, diphenylamine, and the like, may be incorporated to inhibit polymerization during processing.

The copolymerizable monomers with which the polymerizable polyesters or unsaturated alkyds hereinabove described may be copolymerized is a free flowing vinylidene liquid compatible with the alkyd and may be vinyl acetate, styrene, acrylonitrile, methyl, butyl, allyl, crotyl or methallyl acrylates, alpha chloroacrylate, methacrylate, glycol diacrylate or other polymerizable materials, including diallyl phthalate, diallyl, dimethallyl, divinyl, di-isopropanyl or dicrotyl carbonate or other corresponding unsaturated alcohol polyesters of polybasic acids such as phthalic, maleic, oxalic, citric, tartaric, succinic, adipic and the like.

The resin mixtures described above may be copolymerized for purposes of the present invention by means of heat or light, but preferably with polymerization catalysts such as benzoyl peroxide, lauroyl peroxide, tertiary butyl hydrogen peroxide, methyl ethyl ketone peroxide, 1-hydroxy cyclohexyl hydrogen peroxide, ditertiarybutyl hydrogen peroxide and similar active peroxides.

The rate of polymerization may be markedly increased at lower temperatures than otherwise required by the introduction of activators, such as cobalt linoleate, cobalt naphthenate, cuprous oxide, triethanolamine, stannous chloride and other materials known to be suitable for the purpose.

While the unsaturated alkyds described above that have not been subjected to the alcoholysis and acidulation treatments set forth are miscible to more or less extent with many of the above polymerizable materials in substantially greater proportions. For example, one part by weight of an unsaturated alkyd prepared from maleic or fumaric acid and diethylene glycol is compatible with less than 0.2 part by weight of monomeric styrene, whereas a similar alkyd that has been subjected to the alcoholysis and acidulation treatments as above described, is compatible with monomeric styrene in substantially all proportions.

The polymerizable monomer such as styrene may constitute in the order of 20 to 70 percent by weight of the resin. It is preferred to use a proportion of styrene of about 40%, because this value affords maximum dielectric constant with minimum power factor.

An illustrative suitable formulation useful for electric capacitors according to the present invention, comprises ethylene glycol as the saturated polyhydric alcohol, and phthalic and maleic acid anhydride as the polycarboxylic acid reacted in equimolar proportions, admixed with styrene.

The following specific examples are illustrative of methods of preparing the preferred unsaturated alkyds for use in electric capacitors in accordance with the present invention. In these examples, the term "parts" refers to parts by weight:

*Example 1*

1 mol of phthalic anhydride, 10 mols of maleic anhydride and 11 mols of ethylene glycol are reacted together until the acid number has been reduced to 82, which is reached after heating for four hours at 185 degrees C. Approximately 7 parts of the resulting product are added to one part normal propanol and the mixture heated under a reflux condenser with agitation for six hours at a temperature which gradually rises from 125 degrees to 183 degrees C. Carbon dioxide is bubbled through the mixture to maintain an inert atmosphere within the reaction vessel. 33 parts of this product, which has an acid number of about 60, are mixed with 2 parts of acetic anhydride and heated under a reflux condenser at 135 degrees C. with agitation in an inert atmosphere for three hours. The resulting composition when heated at 185 degrees C. for four hours under a pressure of 2 mm. of mercury, is a viscous liquid with an acid number of about 19 which polymerizes readily.

Example 2

10 mols of phthalic anhydride, 10 mols of maleic anhydride and 22 mols of ethylene glycol are reacted together to an acid number of 54 which is reached after heating for four hours at 185 degrees C. Approximately 7 parts of the resulting product are added to one part of normal propanol and the mixture heated under a reflux condenser with agitation for six hours at a temperature which gradually rises from 123 degrees to 183 degrees C. Carbon dioxide is bubbled through the mixture to maintain an inert atmosphere within the reaction vessel. The resulting composition is then topped by heating at 185 degrees C. for four hours under a pressure of 2 mm. of mercury, yielding a viscous liquid with an acid number of about 5 which polymerizes readily.

Example 3

10 mols of phthalic anhydride are reacted with 22 mols of propylene glycol and heated to an acid number of 50. Then 10 mols of maleic anhydride are added and the mix heated under a reflux until the acid number comes down to about 20. The mix is then topped under high vacuum to an acid number of about 2.6.

The formulations of any of the foregoing illustrative examples would be utilized in the electric capacitor are by admixing with the polyunsaturated alkyd resin sufficient polymerizable monomer, preferably styrene, to constitute 20 to 70 percent, preferably about 40 percent by weight of the mixture, and also adding in the order of 1.5 parts of suitable catalyst, such as benzoyl peroxide. Preferably 65 to 75 parts of styrene are used for each 100 parts of the polyunsaturated alkyd resin, that is, about 40 percent of the mixture is styrene.

In the accompanying drawing in which are shown one or more of various possible embodiments of the several features of the invention, Fig. 1 is a longitudinal cross-section of one embodiment of capacitor according to the invention at the stage prior to impregnation, Fig. 2 is a view similar to Fig. 1 of the capacitor after impregnation, Fig. 3 is a view similar to Fig. 1 of another embodiment of capacitor before impregnation, and Fig. 4 is a view similar to Fig. 3 of the capacitor after impregnation and filling of the open end.

Referring now to the drawings, a preferred embodiment of the capacitor shown in Fig. 1 desirably comprises a casing 11, preferably a tube of porous material such as cardboard. The unimpregnated capacitor section 12 positioned in said tube is entirely conventional and may comprise a wound capacitor roll of metal foil and paper with terminals 13 and 14 having their "pig-tailed" root ends 15 electrically and mechanically connected in a conventional manner as by soldering, to the ends of section 12. The casing 11 as shown is longer than and protrudes at both ends beyond the contained section and end seals 17, 18 are retained in said protruding casing ends through which the terminals 13, 14 respectively of the capacitor section 12 extend.

The porous casing 11 and the capacitor section 12 are desirably impregnated with the specified plastic (as shown in shaded lines in Fig. 2), which fills the voids in the capacitor section, the space 16 between the capacitor section and the casing, and also fills the pores in the casing, and when hardened, bonds the various elements of the section into a firm and permanent structure, bonds the casing to the capacitor section and renders hard and impervious the porous casing to form an integral unit. By filling the pores of the casing and the other voids inside the casing and capacitor section, the polymer forms a continuous phase. The capacitor section, therefore, is not simply attached to the inner surface of the casing but is also bonded to the polymer which has permeated the entire thickness of the casing.

The end seals 17, 18 desirably comprise a composition similar to that of the impregnant set forth except that it includes an inert filler, and is devoid of inhibitor. End seals of such composition have a coefficient of contraction which is high enough snugly to embrace the protruding terminals 13 and 14 forming a highly efficacious seal and as the materials used for the end seals and the impregnant are compatible, they will interbond to form an integral unit. The polymer thus forms a plastic matrix in which the capacitor section is encased.

One particular procedure for carrying out the mode of assembly and impregnation above very generally set forth, is as follows:

The unimpregnated section 12 shown in Fig. 1, is inserted into the unimpregnated porous casing 11 which, as above stated, is desirably a cardboard tube. The terminal leads 13 and 14 are thereupon attached in position on the ends of the section in a conventional manner, but, if desired, such terminal leads may be soldered to the capacitor section before it is inserted into the tube.

The open ends of the casing 11 may thereupon be filled with the mixture consisting of the polyunsaturated alkyd, the compatible free flowing liquid monomer, the catalyst, and the inert filler, and the ends 17 and 18 polymerized to harden the latter into an insoluble and infusible state whereby the resin will contract to grip the protruding terminals 13 and 14.

The filling of the ends of the casing 11 with plastic may be done in several ways. Thus, for example, one end of the casing 11 may be preheated by means of infra-red lamp or other suitable means, to a temperature of approximately 250 degrees F. and the mixture above described poured directly into the heated end. The composition set forth has the property of rapidly polymerizing so that the material will not flow down the tube through the section. If desired, as an added precaution, a retaining disc (not shown) may be employd to prevent such flow. Polymerization is thereupon completed to harden the end seal. Such polymerization may be hastened, if desired, by the application of external heat. The above procedure may thereupon be repeated to seal the other end of the casing, but if desired, the two ends of the casing 11 may be filled simultaneously by using a viscous mixture for the end seals, and flowing such mixture into the two ends at low pressure and polymerizing such mixture before any further flow can occur.

If desired, the composition for the end seals may be poured at suitable temperature, without preheating the ends of the casing, and may be subsequently polymerized as by the application of external heat.

The unimpregnated capacitor structure, as above described, and as shown in Fig. 1, is desirably dried and then impregnated, preferably in an impregnant of the polyunsaturated alkyd, the compatible liquid copolymer monomer and the catalyst in the presence of an inhibitor at temperature such as to be free flowing.

The drying and impregnation cycle may be performed in various possible ways of which one will be illustratively set forth. Such cycle may involve the placing of the capacitor units in a treating tank (not shown) and the application of dry heat and vacuum in the conventional manner with the cover of the tank slightly open, to permit removal of water vapor. The dry heat and vacuum are desirably applied for about fifteen hours at a temperature desirably of 250 to 275 degrees F. and with vacuum desirably of 250 microns or better. The tank is thereupon closed and vacuum is applied for approximately one hour with continued maintenance of such temperature to drive off further water and air from the capacitor section. After breaking the vacuum for approximately one-half hour, the vacuum is resumed for a prolonged period, say for about thirteen and one-half hours, eleven hours of which are set at a maximum pressure of 250 microns under continued heating at said temperature of 250 to 275 degrees F. Thereupon the heat is shut off and the tank contents are cooled by passing cold water through the tank jacket (not shown) for a period of three hours while maintaining the vacuum at approximately 250 microns or lower, until the capacitor units are cooled to the neighborhood of 80 degrees F. The capacitors then have a vacuum of 2000 microns applied for about one hour at a maximum temperature of approximately 90 degrees F., the vacuum valve is closed, whereupon the impregnant set forth is admitted by opening the valve in the resin inlet line, care being taken to exclude air from such line. Vacuum is maintained at a pressure of 10,000 microns or lower for five hours and then the vacuum is broken and the impregnated units allowed to remain in the tank submerged in the resin for approximately seven hours.

The capacitor units, after removal from the impregnating tank, are desirably washed with styrene in order to remove surface resin from the impregnated capacitor units. The units are thereupon placed in an oven for about eighteen hours to polymerize the impregnant at a temperature of approximately 150 degrees F.

With the method above described, the free flowing liquid impregnant will penetrate through the pores of the cardboard casing entirely filling such pores and also filling the voids in the capacitor section and the space between the capacitor section and the casing, said impregnant becoming polymerized to a solid essentially insoluble and infusible state, thus bonding the various elements of the capacitor section into a firm and permanent structure with the fibres of the solidified, impregnated casing imparting additional strength thereto. The capacitor section is shielded from the ambient atmosphere by a layer of polymer and by an outer layer of fiber-polymer composite. In this way, the section is contained in a plastic matrix which forms a polymer phase continuous with the polymer filling the interstices of the outer casing. This naturally produces a stronger bond between section and casing than would be present by merely cementing the outer casing to the plastic matrix. As the resin used for the impregnant and for the end seals are compatible, there is no chemical reaction therebetween other than a chemical interbonding action which is highly advantageous in producing the completely solidified unit shown in Fig. 2.

A capacitor of the construction above described, using the resins above described and more completely set forth in the co-pending application above mentioned, is characterized by extraordinary constancy in its performance which is due to the substantially impervious and invariant character of the rock-like casing 11 about the section after impregnation and polymerization. Such capacitor will remain unaffected regardless of the environment in which it is used, whether wet or dry, acid or alkali, whether under high pressure or vacuum and moreover, regardless of the severity of impact to which the unit may be subjected, under severe conditions of service, it will neither disintegrate nor shatter, due to the inherent characteristics of the resin used and to the binding effect of the fibres of the cardboard casing, nor will it even show evidence of minute fissures, so that the protection of the contained capacitor section is complete for all practical purposes.

With the use of the casing 11 about the capacitor section, the need for separate, expensive molding equipment is avoided as is the time consuming pouring of the resin into the mold and the cleaning of the mold after use. In addition, the relatively delicate operation of centering the section in the mold so that the resin will cover the entire outer surface thereof with a layer of substantially uniform thickness is also avoided.

Although the casing of the capacitor unit shown in Figs. 1 and 2 has been described as a cardboard tube, it is of course to be understood that the casing could be a porous ceramic tube or a strip of porous paper desirably of width greater than the capacitor section and wound around the latter with the free end of the paper strip secured in place by suitable cement.

The embodiment of capacitor shown in Figs. 3 and 4 is generally similar to the embodiment of Figs. 1 and 2, except for the casing which is of substantially nonporous material, desirably a metal tube preferably having inturned ends 22.

In assembling the unit shown in Figs. 3 and 4, after the capacitor section 23 is inserted into the casing 21 with the terminals 24, 25 of the section protruding from the ends of the casing 21, one end of the latter is filled as at 26 with the same composition used for end seals 17 and 18 and the partially assembled unit is thereupon dried and impregnated, all as above described in respect to the embodiment shown in Figs. 1 and 2, the impregnant readily entering through the open end as shown by arrows in Fig. 3. The impregnant will thoroughly impregnate the capacitor section 23 and completely fill the interstices between the section and after the units are removed from the impregnation tank and preferably washed with styrene to remove excess impregnant, the open end of the casing 21 is sealed as at 27 with the same composition used at the other end at 26 and the casing is thereupon placed in an oven as heretofore described to polymerize the impregnant.

Although the non-oporus casing 21 of the capacitor unit shown in Figs. 3 and 4 has been described as a metal tube, it is of course to be understood that the casing could be of other substantially impervious material such as plastic tubing, glazed ceramic, a paper tube with an interleaving impervious film material wound between the layers of paper of the tube, a strip of plastic film material, a strip of metal foil; or a combination of strips of paper, metal foil or plastic film, could be wound around the capacitor section with the free end of the strip secured in place by suitable contact.

Obviously instead of admitting the impregnant through the wide open end of the casing 21 as shown in Fig. 3, both of the end seals 26 and 27 could be applied prior to introducing the impregnant, which enters through appropriate passageways (not shown) provided in such seals, impregnant filling such passageways, subsequently hardening and polymerizing to provide a completely sealed unit.

Thus, the non-porous casing 21 for the capacitor section serves as does casing 16 as a mold for the plastic about the capacitor section.

It is of course understood that this invention is applicable not merely to the type of capacitor section heretofore generally conventional and which comprises metal foil with intervening sheets of dielectric, but the invention is also applicable to that type of capacitor section in which the dielectric and foil are incorporated in a single sheet such as one of metallized paper.

As many changes could be made in the above construction and method, and many apparently widely different embodiments of this invention could be made without departing from the scope of the claims, it is intended that all matter contained in the above description or shown in the accompanying drawings shall be interpreted as illustrative and not in a limiting sense.

Having thus described our invention what we claim as new and desire to secure by Letters Patent of the United States is:

1. An electrostatic capacitor of the type comprising a capacitor section including metal electrodes and porous insulating interspacers, a casing encompassing said section and extending beyond the ends thereof, impervious plugs sealing the ends of said casing and terminals extending from the respective electrodes through said plugs wherein the casing is of porous tube stock in which polyunsaturated alkyd-styrene copolymer impregnates the capacitor section, completely fills the space between the capacitor section and the casing and between the capacitor section and the end plugs, impregnating the porous casing, said copolymer rendering the structure impregnated thereby a permanent, unitary, rock-like, insoluble and infusible mass, thus maintained under all temperatures of use of the capacitor, and said end plugs being compatible with said impregnant.

2. An electrostatic capacitor comprising a capacitor section including metal electrodes and porous insulating interspacers, an external casing spaced from and surrounding said section, and protruding from both ends thereof, said casing being made of porous paper stock, impervious plugs fitting into the protruding ends of said casing, a pair of terminals connected to said electrodes and protruding from opposite ends of said section through the impervious end plugs thereof, said casing having its pores filled with polyunsaturated alkyd-styrene copolymer and a matrix of polyunsaturated alkyd-styrene copolymer, said matrix forming a phase continuous with the copolymer filling the pores of said casing, the space between said casing and said section, the interstices of said capacitor section and the pores of said interspacer partially enclosing said terminals so that said capacitor section, said casing and said terminals are all firmly bonded together by a continuous copolymer phase to form a unitary mass, said end plugs filling the ends of the casing that protrude beyond said section and being of plastic compatible with said copolymer.

References Cited in the file of this patent

UNITED STATES PATENTS

| | | |
|---|---|---|
| 1,594,124 | Shrader | July 27, 1926 |
| 1,766,370 | Beyland | June 24, 1930 |
| 2,128,990 | Dubilier | Sept. 6, 1938 |
| 2,181,695 | Given | Nov. 28, 1939 |
| 2,549,770 | Burnham | Apr. 24, 1951 |